July 9, 1940.  G. R. EGO  2,206,947
FORECARRIAGE PLOW
Filed March 23, 1939  2 Sheets-Sheet 1
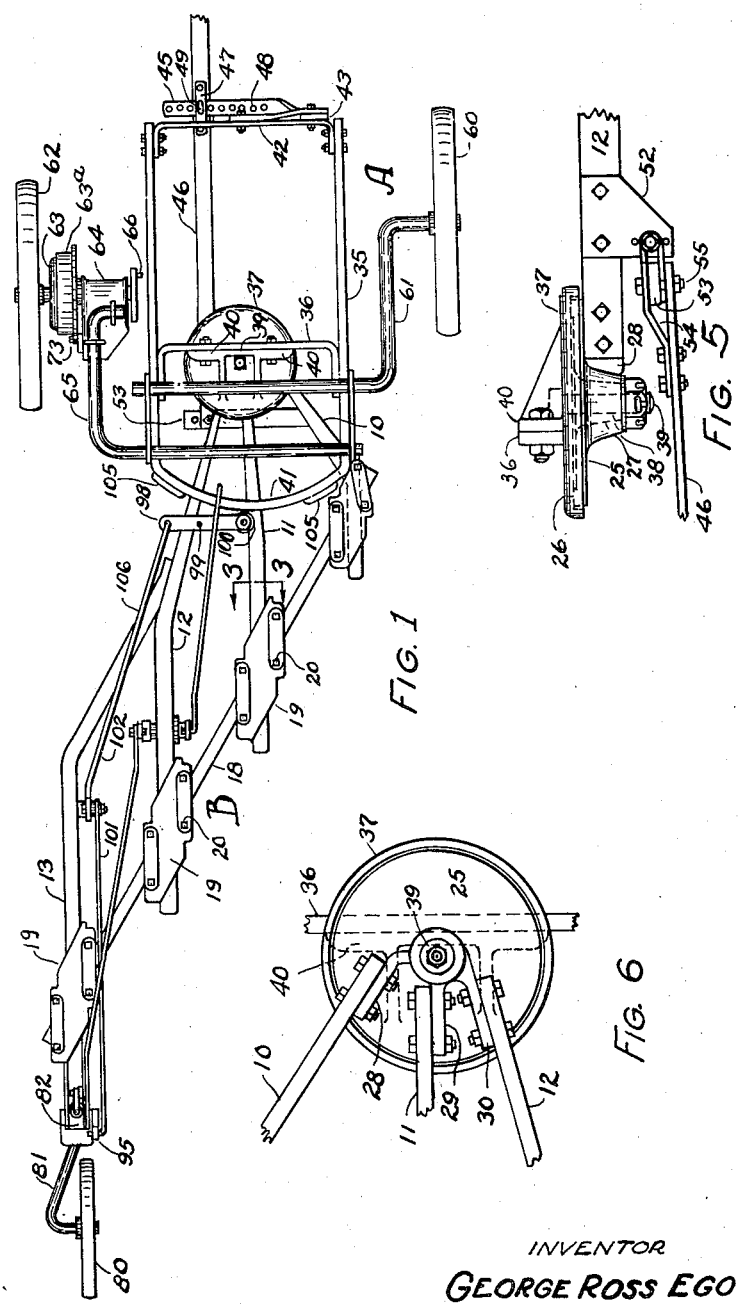
INVENTOR
GEORGE ROSS EGO
BY A.S.Kroh
ATTORNEY

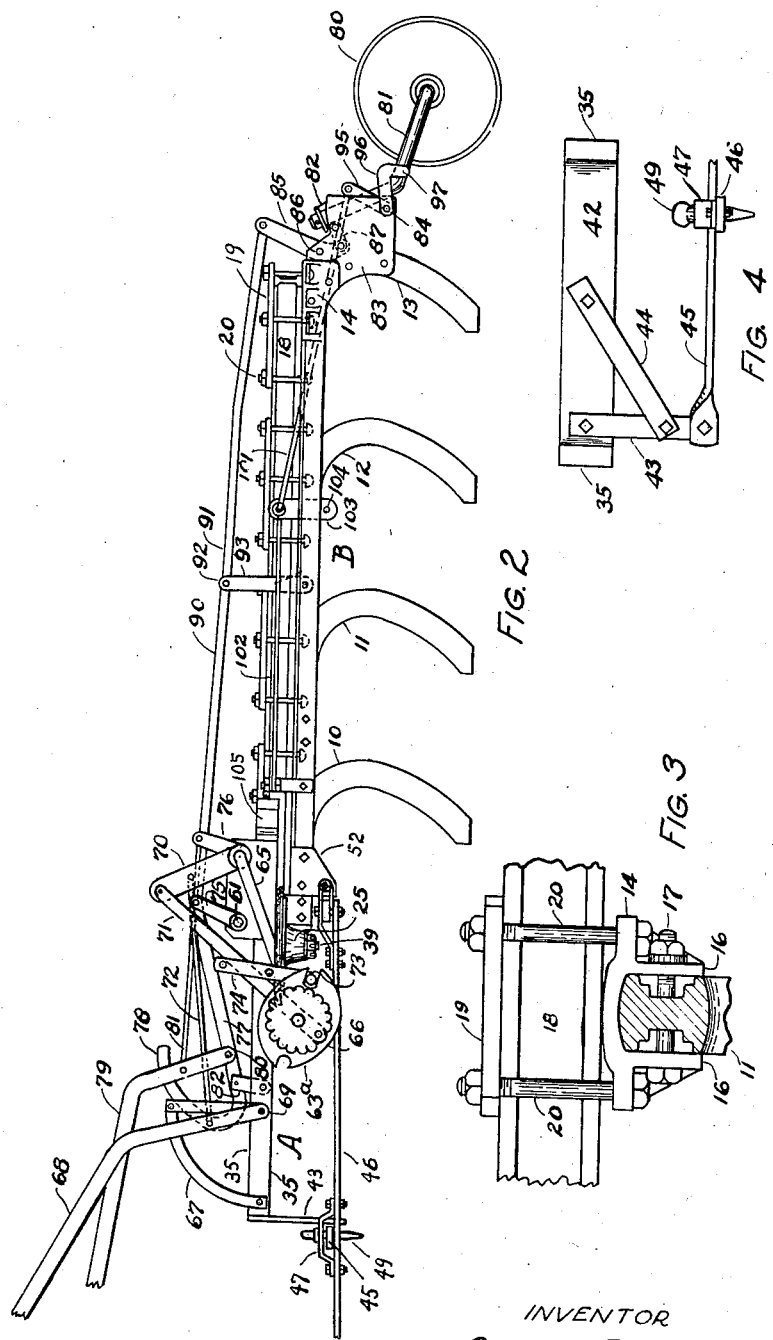

Patented July 9, 1940

2,206,947

UNITED STATES PATENT OFFICE 2,206,947

FORECARRIAGE PLOW

George Ross Ego, Brantford, Ontario, Canada, assignor to Massey-Harris Company Ltd., Toronto, Ontario, Canada Application March 23, 1939, Serial No. 263,610

7 Claims. (Cl. 97—101)

The present invention relates to plows which are adapted to be drawn by tractors through a lynch pin draw bar.

An object of the present invention is to provide a plow having new and novel means for guiding the plow or causing it to trail the tractor in a manner which will insure a uniform furrow and whereby the plow will follow the tractor at end turns in the most efficient manner.

A further object of the present invention is to provide a forecarriage whereby the plowing mechanism may be easily attached and detached and whereby the carriage is suitable for attachment to other earth working implements.

An advantage of the present invention is that the tractor may be turned short without sliding the wheels and without adding special strains to the device.

Another object of the present invention is to provide simple and inexpensive but effective means for fastening the rear ends of the beams together whereby two, three or four beams may be secured together by the use of duplicate brackets and a straight connecting member.

The conventional tractor drawn plows are not satisfactory because they constitute a rigid frame which extends quite a distance in rear of and in front of the front carrying wheels. Therefore, the plow, when in operating position, is inclined to move in straight lines and in a fixed direction which may not always be the exact direction the tractor is travelling. The action of the hitch frequently forces the rear or front carrying wheel to slide sideways in one direction or the other.

I provide means whereby the hitch is free to move vertically but adjustably secured horizontally to the forecarriage. Thus the hitch guides the forecarriage whereby the front bottom may be caused to cut a uniform and desired width of furrow. The hitch at its rear end is secured to the beams and in rear of the forecarriage wheels thus the draft line is behind and below the fulcrum point thereby to pull the plows without side draft and act to hold them in the ground.

A novel feature of the present invention is that the rear wheel is held normally in a predetermined position having means whereby this wheel may be free to caster after the forecarriage has been turned to a predetermined angle in either direction.

One of the principal advantages of the present invention is that the forwardly extending control levers do not swing sideways when the tractor is turned but follow the tractor in nearly a fixed relative position because the forecarriage is caused to trail the tractor the same as the four wheels of a wagon turns with and follows the horses.

To these and other useful ends, my invention consists of parts, combinations of parts, or their equivalents, and mode of operation, as hereinafter described and claimed and shown in the accompanying drawings in which:

Fig. 1 is a top plan view of one form of my improved plow.

Fig. 2 is a side elevation of the device as shown in Figure 1.

Fig. 3 is an enlarged fractional section taken on line 3—3 of Figure 1.

Fig. 4 is a front fractional end view of my device illustrating the forecarriage guiding means as connected to the hitch bar.

Fig. 5 is a side elevation view of the fifth wheel illustrating fractional parts of the plow unit and draw bar.

Fig. 6 is a bottom view of the fifth wheel beam bracket showing a fraction of the beams connected thereto.

It will be understood that I have illustrated the preferred form of my device and that the frame may be made to carry one, two, three or four plow bottoms or that the frame may be differently designed and adapted to carry other kinds of earth working tools.

As illustrated, the forecarriage in its entirety is designated by reference character A and the plow unit in its entirety is designated by reference character B.

I have disclosed a four bottom gang comprising a front beam 10 and beams 11, 12 and 13 respectively. Beams 10, 11 and 12 are shaped and secured at their front ends to the fifth wheel bracket as will hereinafter appear. Beam 11 in a three or four bottom gang is preferably made nearly straight as illustrated.

The rear ends of the beams are held in spaced relation by means of brackets 14 which are preferably shaped so as to embrace the beams as illustrated in Figure 3, each bracket having downwardly extending lips 16—16 which are adapted to tightly embrace the beams by means of bolts 17.

Brackets 14 are provided with seats or surfaces on their upper sides for the reception of brace member 18 and having a shape and ears which correspond with an upper plate 19. Bolts 20 serve to firmly hold member 18 to bracket 14. Thus it will be seen that I have provided a simple but strong frame for carrying the earth working tools which in the present showing are intended to be mould board plow bottoms (not shown).

The front ends of the beams are secured together by means of the bottom fifth wheel portion 25 (see Figures 5 and 6) having a relatively large circular upper surface 26 and an opening 27 in its center and downwardly and rearwardly extending flanges 28, 29 and 30 forming surfaces to which beams 10, 11 and 12 are secured by means of suitable bolts.

Member A comprises a U-shaped frame member 35 having a transverse frame brace 36. I provide an upper fifth wheel bracket 37 which is adapted to contact surface 26 and being provided with a trunnion 38 which is loosely journaled in opening 27 and held therein by means of bolt 39.

Member 37 is provided with a flange 40 which is rigidly secured to frame brace 36 as illustrated in Figure 1. Thus it will be seen by scrutinizing Figures 1 and 5 that forecarriage A is substantially pivotally mounted on bracket 25 or the forecarriage may be stated as being pivotally mounted on the front ends of the beams. Surface 26 on member 25 is large enough to stabilize the forecarriage horizontally and to stabilize the beams transversely.

Thus it will be seen that the forecarriage may be turned to the right or to the left the same as the two front wheels of a wagon, because the connection between the beams and forecarriage is equivalent to the fifth wheel on a wagon.

The rear portion 41 of member 35 is curved on a radius to member 38 and is positioned over the top of the beams as illustrated in Figures 1 and 2. The front ends of member 35 are secured together by means of a cross brace 42.

I provide a downwardly extending member 43 (see Figure 4) having a brace 44. A hitch link 45 is pivotally mounted to the lower end of member 43 (see Figure 4). I provide a hitch bar 46 having a bracket 47 which extends over member 45 and is provided with an aperture which registers with an aperture in member 46. Link 45 is provided with a number of closely spaced apertures 48.

Thus hitch bar 46 may be swung to the right or left and locked in any desired position by means of linch pin 49. Thus the relative position of the front end of bar 46 may be changed to different positions relative to bar 45 in order to secure the desired width furrows for the front bottom of the plow.

I provide preferably brackets 52—52 which are secured to the front ends of beams 10, 11, and 12 as illustrated in Figure 5 and having pivotally secured thereto a transverse brace 53. The rear end of hitch bar 46 is provided with a bracket 54 and hingedly secured to member 53 by means of a bolt 55.

Member 53 is provided with a number of orifices whereby the rear end of member 46 may be moved to the right or left in order to provide a suitable line of draft for the hitch bar.

Thus it will be seen that I pivotally secure the hitch bar to the front ends of the beams and being low enough to clear the end of bolt 39 so the hitch bar is free to be adjusted to any transverse position and is free to swing vertically relative to the front end of the forecarriage.

Thus the hitch to the beams is in rear of the ground wheels so that the line of pull is in rear of and below the fulcrum point and will therefore have a tendency to hold the plow bottoms into the ground. Since the front end of the hitch bar 46 is free to move vertically, the plow and tractor will be permitted to travel over uneven ground without influencing the plows vertically.

Clearly the hitch bar may be secured directly to member 25 if desired. I prefer however to make the connections for the hitch directly to and somewhat below the beams.

In the present invention I provide a front furrow wheel 60 having a cranked axle 61, the rear transverse portion of which is hingedly mounted on frame member 35. A land wheel 62 is provided having a connection to the constantly rotating member 63 of a power lift clutch. The other member 63a of the clutch is rotatably mounted in bracket 64, the bracket being secured to an L axle member 65. The transverse end of this axle is pivotally mounted on frame member 35. A crank 66 is secured to the intermittently rotating member of clutch 63a.

I mount a sector 67 on the left front corner of frame 35 having a lever 68 with a latch (not shown) adapted to engage the sector, the lever being pivotally mounted at its lower end to member 35 as at 69. An arm 70 is pivotally mounted at its lower end to the transverse portion of member 65.

A link 71 forms an operating connection between arm 70 and crank 66 and a link 72 forms an operating connection between arm 70 and lever 68 as illustrated. The intermittently operating member of clutch 63 is operatively engaged by a roller 73 which is controlled by a lever 74 having a rope at its upper end which extends to within reach of the operator.

The clutch mechanism is adapted to operate when the rope is pulled so as to disengage roller 73 causing the clutch to turn one half turn thus to cause crank 66 to rotate one half turn and move the ground wheel 62 downward relative to the forecarriage and hold it in this position until the rope is again pulled causing the clutch to turn another half turn so it will return to its original position. Thus the land side of the forecarriage will be raised and lowered by the action of the clutch and crank 66 through link 71.

It will be noted that lever 68 is adapted to rotate arm 70 on its support 65. Thus it will be seen that while the clutch mechanism raises and lowers the forecarriage a predetermined amount, lever 68 determines the position of the forecarriage frame relative to the ground in either position of the clutch.

It is desired to operate wheel 60 simultaneously with wheel 62. For this purpose I provide arm 75 which is rigidly secured to the transverse portion of member 61. I rigidly mount a lever 76 on the horizontal portion of member 65 and form an operating connection between members 75 and 76 in the following manner:

A bar 77 is pivotally mounted to the upper end of arm 75 having at its forward end a sector 78. A lever 79 is pivotally mounted on bar 77 as at 80 the lever having latch mechanisms (not shown) which will engage the teeth in sector 78. A link 81 forms an operating connection between the free end of arm 76 and lever 79.

Thus it will be seen that axles 61 and 65 will be caused to turn in unison and the relative position of axle 61 to member 65 may be adjusted by simply moving lever 79 into various positions on its sector. The front end of arm 77 is held in its normal position by means of a link 82, the link being pivotally mounted on this arm and frame 35 as illustrated.

Forecarriage A, insofar as the raising, lowering and power lifting device is concerned is very similar to these parts on the conventional tractor plow and will operate the same differing however only in that the forward ends of the levers will not sweep transversely across the rear of the tractor as in the conventional plow.

I provide a rear furrow wheel 80 which is mounted on a caster axle 81, the upper end of the axle being journaled in a bracket 82 which is mounted between plates 83—83, one plate on either side of the rear end of the beam as illustrated. Bracket 82 is hingedly secured to plates 83 as at 84.

I provide a bell crank 85 which is hingedly mounted as at 86, the lower end of member 85 being provided with a link 87, the link forming an operating connection between the lower end of member 85 and the upper end of bracket 82. Thus when the upper end of member 85 is moved forward, axle 81 will be turned on hinge 84 so as to lift the rear ends of the beams. This movement is accomplished by means of a connection to arm 75 by links 90 and 91, these links being hingedly connected together as at 92 and supported in their working position at this point by means of a pivoted arm 93.

When the power lift mechanism operates to lift the plow, member 61 will be turned on its axis which in turn will move the upper end of lever 85 forward and lift the rear end of the plow. Thus it will be seen that the front and rear ends of the plow will be lifted by the power clutch and the height of the forecarriage will be regulated by the position of members 68 and 79. Thus the front end of member B will also be regulated as to its height from the ground and as to the depth of furrows turned.

I provide an arm 95 having an operating connection to a forked bracket 96, the bracket 96 being pivotally mounted to plates 83 as at 84 and having a downwardly extending forked member 97 which is adapted to embrace axle 81 when in its working position. In the present organization, it is intended to disengage forks 97 from axle 81 when the forecarriage is turned to a predetermined angle in either direction as follows:

A lever 98 is pivotally mounted on one of the beams as at 99 having mounted on its inner end a roller 100. An operating connection is made between member 95 and member 98 by means of links 101 and 102. The adjacent ends of these links are pivotally secured to the upper end of a carrying arm 103, the lower end of this arm being pivotally mounted to beam 13 as at 104. A spring or other means (not shown) is provided whereby member 96 is normally held in the position shown in Figure 2.

I provide raises 105—105 which I secure to member 41 and being adapted to contact and lift roller 100 when the forecarriage is turned to or past a predetermined angle in either direction. Thus when roller 100 is lifted, because of a sharp turn of the tractor, member 96 will be lifted out of engagement with axle 81 leaving wheel 80 free to caster in either direction.

Thus it will be seen that insofar as raising the plows out of the ground and regulating the depth and angle, my device will operate similar to the conventional tractor plow but that the forecarriage is adapted to follow the tractor as it turns to the right or left and cause the gangs to easily follow the tractor.

The movement of the forecarriage is perfectly free and the rear carrying wheel will trail after the forecarriage exactly like the rear end of a wagon follows the forecarriage of a wagon.

Attention is called to the fact that the conventional tractor plow will, when the tractor is turned, cause the front ends of the levers to move in the opposite direction so that they are never in the same position except when moving straight ahead. This makes it inconvenient and in some respects dangerous to the operator.

In the present invention, the forecarriage always turns in the direction the tractor is turned so that the front ends of the levers remain in practically the same relative position to the tractor.

Clearly many minor detail changes may be made without departing from the spirit and scope of the present invention as recited in the appended claims. For example, my forecarriage may be used for pulling other types of soil working tools. Two beams may extend rearwardly and outwardly providing means for carrying lister bottoms on their rear ends, the beams at their rear ends having spacing means or any sort of frame may be secured to the lower half of the fifth wheel and be adapted to carry any sort of ground working tool which may be moved into and out of the ground similar to the present showing or otherwise.

Having thus shown and described my invention, I claim:

1. A device of the class described, comprising a beam having an earth working tool secured to its rear end, a two wheeled forecarriage having a substantial vertically pivoted connection to the front end of said beam, a hitch bar being pivotally connected at its rear end to the front end of said beam, a link pivotally secured at one end to said forecarriage in advance of said vertical pivot and at its other end to said hitch bar whereby the direction of travel of the forecarriage is controlled by the hitch bar.

2. A device of the class described, comprising a frame having earth working tools secured to its rear end, a two wheeled forecarriage having a substantial vertically pivoted connection to the front end of said frame, a hitch bar being pivotally connected at its rear end to the front end of said frame, a link pivotally secured at one end to said forecarriage in advance of said vertical pivot and at its other end to said hitch bar whereby the direction of travel of the forecarriage is controlled by said hitch.

3. A device of the class described, comprising a frame having earth working tools and a carrying wheel secured to its rear end, a two wheeled forecarriage having a substantial vertically pivoted connection to the front end of said frame, a hitch bar being pivotally connected at its rear end to the front end of said frame, a link pivotally secured at one end to said forecarriage in advance of said vertical pivot and at the other end to said hitch bar whereby the direction of travel of the forecarriage is controlled by said hitch.

4. A device of the class described, comprising a frame having earth working tools and a carrying wheel secured to its rear end, a two wheeled forecarriage having a substantial vertically pivoted connection to the front end of said frame, a hitch bar being pivotally connected at its rear end to the front end of said frame, a link pivotally secured at one end to said forecarriage in advance of said vertical pivot and at its other end to said hitch bar whereby the direction of travel of the forecarriage is controlled by said hitch bar, manually controlled means operatively connecting the wheels of said forecarriage and said rear wheel whereby the front and rear ends of said beams may be optionally raised and lowered.

5. A ground working device of the class described, comprising a number of beams being secured together at their front ends and spaced transversely and longitudinally at their rear ends, earth working tools secured to the rear ends of said beams, a carrying wheel secured to the rear end of one of said beams, a two wheel forecarriage having a substantial vertically pivoted connection to the front ends of said beams, a hitch bar being pivotally connected to the front ends of said beams, a link pivotally secured at one end to said forecarriage in advance of said vertical pivot and at its other end to said hitch bar whereby the direction of travel of the forecarriage is controlled by said hitch bar, manually controlled means operatively connecting the wheels of said forecarriage and said rear wheel whereby the front and rear ends of said beams may be optionally raised and lowered, levers operatively connected to said means whereby the vertical position and transverse angle of said beams may be manually controlled.

6. A gang plow of the class described, comprising a number of spaced beams and at least two being secured together at their front ends by means of a bracket, a two wheeled forecarriage having a bracket substantially vertically hingedly connected to said first bracket, a draw bar hingedly secured to said beams, said draw bar being attached horizontally to said frame but being free at its front end to move vertically, a carrying wheel at the rear of said beams, a clutch having means adapted to raise and lower said beams fore and aft, upwardly and forwardly extending levers secured to said forecarriage having means adapted to regulate the height and transverse angle of the front ends of said beams independent of said clutch.

7. A gang plow of the class described, comprising a number of spaced beams and at least two of said beams being secured together at their front ends by means of a bracket, a two wheeled forecarriage having a bracket substantially vertically hingedly connected to said first bracket, a draw bar secured to the front ends of said beams and extending a distance forwardly and having means to thereby be free to swing vertically and adjustable means for positioning its front end in a predetermined transverse position relative to the front end of said forecarriage, a carrying caster wheel at the rear of said beams, a clutch on said forecarriage having means for lifting said beams fore and aft, forwardly and upwardly extending levers adapted for manually regulating the height and transverse angle of said forecarriage, means whereby said caster wheel will remain normally locked but permitted to caster when said forecarriage is turned past a determined angle in either direction.

GEORGE ROSS EGO.